(12) United States Patent
Na

(10) Patent No.: US 8,833,400 B2
(45) Date of Patent: Sep. 16, 2014

(54) SILICON HOSE INTEGRATED WITH SENSOR PORT AND METHOD FOR MANUFACTURING THE SAME

(75) Inventor: Sung Wook Na, Yongin (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 1082 days.

(21) Appl. No.: 12/833,776

(22) Filed: Jul. 9, 2010

(65) Prior Publication Data

US 2011/0073206 A1    Mar. 31, 2011

(30) Foreign Application Priority Data

Sep. 28, 2009 (KR) ........................ 10-2009-0092062

(51) Int. Cl.
| | |
|---|---|
| F16L 55/00 | (2006.01) |
| F16L 11/00 | (2006.01) |
| F16L 55/10 | (2006.01) |
| F16L 39/00 | (2006.01) |
| F16L 41/00 | (2006.01) |
| F16L 45/00 | (2006.01) |
| F16L 51/00 | (2006.01) |
| F16L 47/28 | (2006.01) |
| F16L 47/30 | (2006.01) |

(52) U.S. Cl.
CPC .............. *F16L 41/008* (2013.01); *F16L 47/28* (2013.01); *F16L 47/30* (2013.01)
USPC ........ 138/104; 138/92; 138/138; 285/133.11; 285/197

(58) Field of Classification Search
CPC ......... F16L 41/008; F16L 41/06; F16L 41/12; F16L 47/28; F16L 47/30; F16L 47/345; B29C 66/52241
USPC .......... 138/104, 153, 92, 94, 99, 137; 29/428; 285/222.1–222.3, 197, 201, 133.11, 285/133.21, 133.3, 133.4; 428/35.7, 36.6, 428/36.8, 36.9, 36.92
See application file for complete search history.

(56) References Cited

U.S. PATENT DOCUMENTS

| 1,162,595 | A | * | 11/1915 | Forgey ........................... 285/199 |
| 3,215,761 | A | * | 11/1965 | Gelpey ........................... 264/139 |
| 3,649,055 | A | * | 3/1972 | Nilsen ............................ 285/197 |
| 3,823,250 | A | * | 7/1974 | De Monsy et al. .......... 174/23 R |
| 4,491,349 | A | * | 1/1985 | Rice et al. ..................... 285/197 |
| 4,545,830 | A | * | 10/1985 | Dienes et al. ................... 156/48 |
| 4,654,942 | A | * | 4/1987 | Rush et al. ................ 29/890.144 |

(Continued)

FOREIGN PATENT DOCUMENTS

| EP | 1 643 097 A1 | 4/2006 |
| JP | 02-021093 | 1/1990 |

(Continued)

*Primary Examiner* — Paul R Durand
*Assistant Examiner* — Matthew Lembo
(74) *Attorney, Agent, or Firm* — Edwards Wildman Palmer LLP; Peter F. Corless

(57) ABSTRACT

The present invention provides a silicon hose integrated with a sensor port, which includes a base hose and a sensor port. The sensor port includes a sensor connection portion and an embedded portion integrally formed therewith. By embedding the embedded portion in the hose, the sensor port is integrally fixed on an outer circumference of the hose. According to the present invention, it is possible to contribute to a reduction in cost and weight and an improvement in fuel efficiency.

12 Claims, 5 Drawing Sheets

(56) References Cited

U.S. PATENT DOCUMENTS

| | | | |
|---|---|---|---|
| 4,708,374 A * | 11/1987 | Cox | 285/133.4 |
| 4,894,521 A * | 1/1990 | Evans | 219/535 |
| 4,978,255 A * | 12/1990 | Gale et al. | 408/1 R |
| 5,020,832 A * | 6/1991 | Coblentz | 285/197 |
| 5,199,145 A * | 4/1993 | McMillan et al. | 29/237 |
| 5,722,463 A * | 3/1998 | Smyth et al. | 138/170 |
| 5,814,387 A * | 9/1998 | Orihara et al. | 428/63 |
| 6,230,751 B1 * | 5/2001 | Sjotun | 138/153 |
| 6,361,841 B1 * | 3/2002 | Hasegawa et al. | 428/35.7 |
| 7,000,745 B2 * | 2/2006 | Christenson et al. | 188/379 |
| 2009/0140516 A1 * | 6/2009 | King et al. | 285/197 |
| 2010/0243097 A1 * | 9/2010 | Jani | 138/129 |

FOREIGN PATENT DOCUMENTS

| | | |
|---|---|---|
| JP | 2000-193152 A | 7/2000 |
| JP | 3108256 B2 | 11/2000 |
| JP | 2002-195039 A | 7/2002 |
| JP | 2004-340865 A | 12/2004 |
| JP | 3108256 U * | 4/2005 |
| JP | 2005201389 A * | 7/2005 |
| JP | 2006-064655 A | 3/2006 |
| JP | 2006-077907 A | 3/2006 |
| WO | 01/12962 A1 | 2/2001 |

* cited by examiner

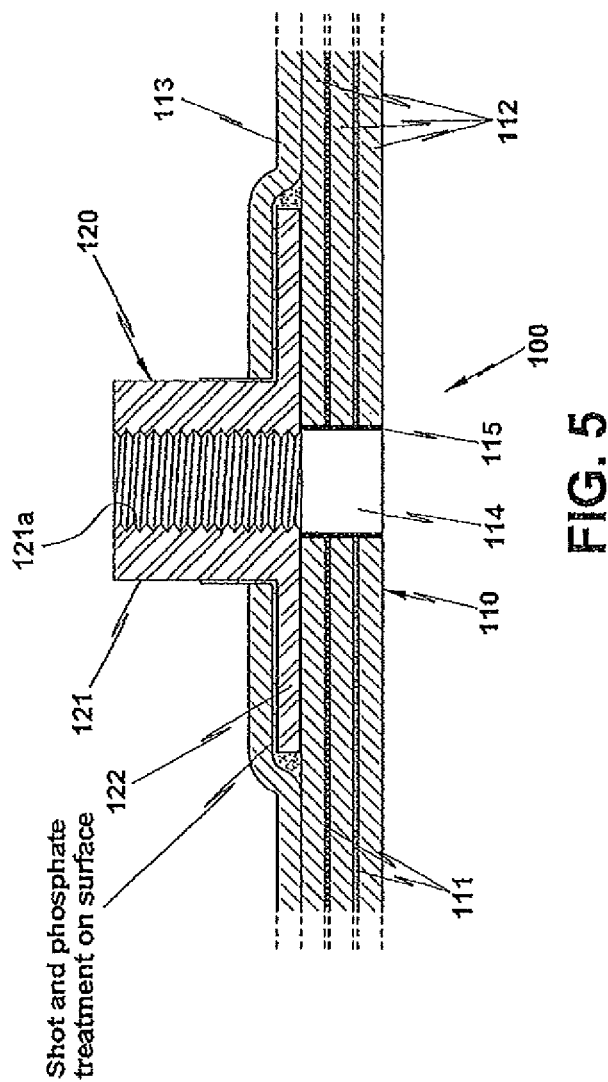

SILICON HOSE INTEGRATED WITH SENSOR PORT AND METHOD FOR MANUFACTURING THE SAME

CROSS-REFERENCE TO RELATED APPLICATION

This application claims under 35 U.S.C. §119(a) the benefit of Korean Patent Application No. 10-2009-0092062 filed Sep. 28, 2009, the entire contents of which are incorporated herein by reference.

BACKGROUND (a) Technical Field

The present disclosure relates to a silicon hose and a method for manufacturing the same. More particularly, it relates to a silicon hose for use in a coolant loop of a fuel cell system and a method for manufacturing the same.

(b) Background Art

A fuel cell system applied to a hydrogen fuel cell vehicle comprises a fuel cell stack for generating electricity by an electrochemical reaction of reactant gases, a hydrogen supply system for supplying hydrogen as a fuel to the fuel cell stack, an air supply system for supplying oxygen-containing air as an oxidant required for the electrochemical reaction in the fuel cell stack, a thermal management system for removing reaction heat from the fuel cell stack to the outside of the fuel cell system, controlling operation temperature of the fuel cell stack, and performing water management function, and a system controller for controlling the overall operation of the fuel cell system.

In the above configuration, the fuel cell stack generates electrical energy by the electrochemical reaction of hydrogen and oxygen as reactant gases and discharges heat and water as by-products of the reaction. A system for cooling the fuel cell system to prevent the temperature rise of the fuel cell stack is required in the fuel cell system.

In a typical fuel cell system for a vehicle, a water cooling system for circulating water through a coolant channel in the fuel cell stack is used to cool the fuel cell stack, thus maintaining the fuel cell stack at an optimal temperature.

A configuration of the cooling system of the fuel cell vehicle is shown in FIG. 1. As shown in the figure, the cooling system comprises a coolant line 3 disposed between a fuel cell stack 1 and a radiator 2 to circulate a coolant, a bypass line 4 and a valve 5 for bypassing the coolant so as not to pass through the radiator 2, and a water pump 6 for pumping the coolant from the coolant line 3.

The pipes constituting the coolant loop of the fuel cell system (vehicle) should be made from a certain material that releases no or less ions because released ions would cause a serious problem that the electricity generated from the fuel cell stack may flow through the coolant, which may cause a serious danger to the driver and passengers.

To prevent this problem, the electrical conductivity of the coolant is measured in the fuel cell vehicle at all times, and a control logic for shutting down the fuel cell system when the electrical conductivity is increased to a predetermined level is employed. Moreover, a deionizer 7 may be provided in the coolant loop to maintain the ion conductivity of the coolant below a predetermined level.

Materials that can be used to make such pipes include, for example, SUS316L, Teflon, Al 3003, Food-Grade silicon, and the like.

FIG. 2 shows a configuration of a coolant pipe for applied to a fuel cell vehicle, in which a silicon hose 11 for preventing ion release is used.

A silicon hose does not cause ion release problem, is light in weight, and is inexpensive. It is, however, impossible to mount to the silicon hose a variety of sensors for measuring the temperature, pressure, and ion conductivity of the coolant; accordingly, a metal part 12 such as SUS316L is used where the sensor is mounted. More particularly, for example, as shown in FIG. 2, a sensor port 20 is welded and fixed to the manifold 12 formed of SUS3161L or to a predetermined position of the pipe, and the sensor is inserted and fitted into the fixed sensor port 20.

However, when a metal part is used, the overall weight and manufacturing cost are increased, which reduces the fuel efficiency and makes mass production difficult.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

In one aspect, the present invention provides a silicon hose integrated with a sensor port. The silicon hose comprises a base hose, a sensor port, and a silicon-based outer cover layer. The sensor port includes a sensor connection portion and an embedded portion integrally formed with the sensor connection portion. The silicon-based outer cover layer surrounds the base hose and the embedded portion such that the sensor port is integrally fixed on an outer circumference of the base hose.

In another aspect, the present invention provides a method for manufacturing a silicon hose integrated with a sensor port. The method includes: providing a base hose; providing a sensor port including a sensor connection portion by which a sensor is to be mounted and an embedded portion integrally formed with the sensor connection portion; forming an outer cover layer onto the base hose by placing the embedded portion on an outer surface of the base hose and winding a silicon sheet material on the base hose and the embedded portion; and subjecting to a silicon curing process the base hose and the outer cover layer formed onto the base hose.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the present invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIG. 5 is a cross-sectional view taken along line A-A of FIG. 4.

Figure 1:
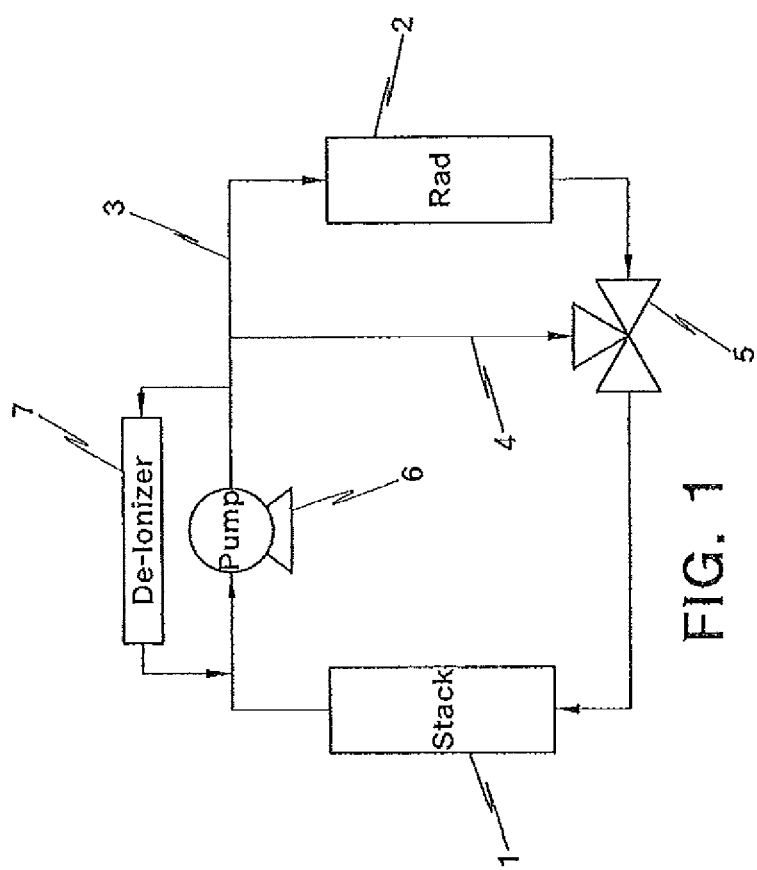
FIG. 1 is a schematic diagram showing a cooling system of a fuel cell vehicle.
Figure 2:
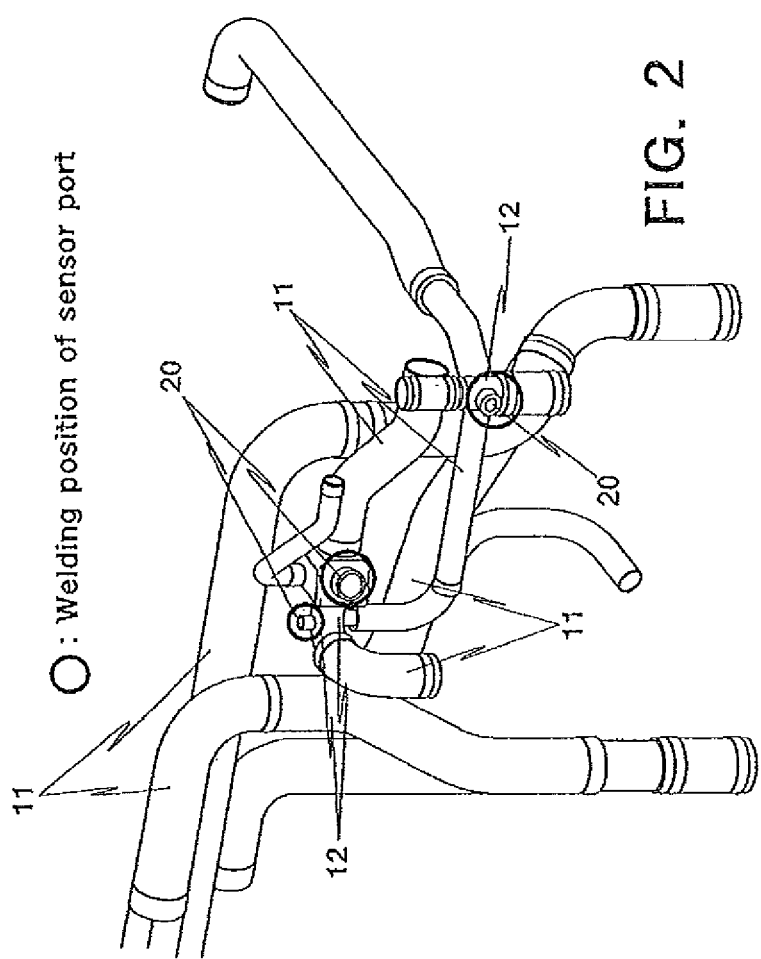
FIG. 2 is a diagram showing a configuration of a coolant pipe applied to a fuel cell vehicle.

Reference numerals set forth in the Drawings includes reference to the following elements as further discussed below:

| | |
|---|---|
| 100: silicon hose | 110: base hose |
| 111: reinforcing layer | 112: silicon layer |
| 113: outer cover layer | 114: opening |
| 115: waterproof layer | 120: sensor port |
| 121: sensor connection portion | 122: embedded portion |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 3:
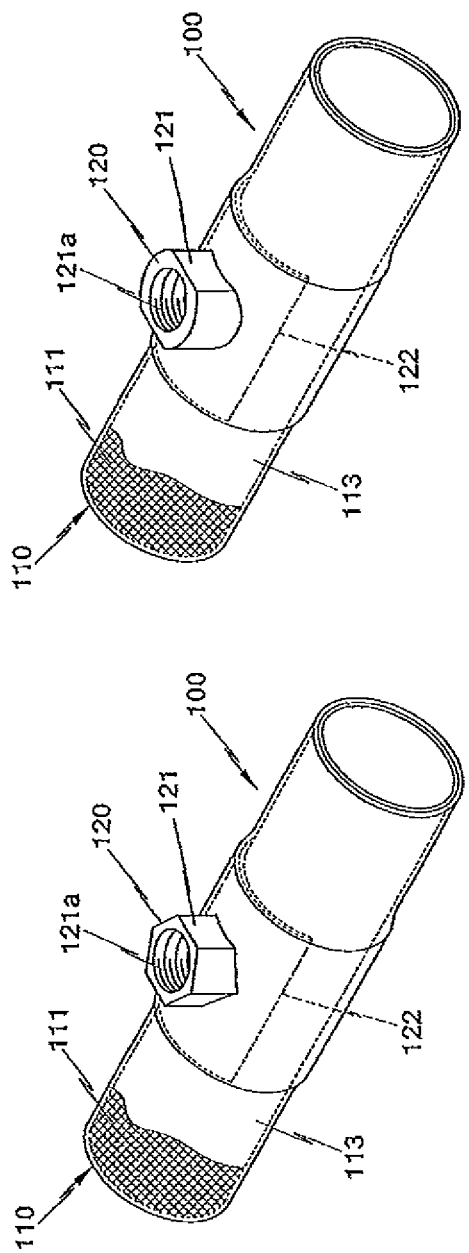
FIG. 3 is a perspective view showing a silicon hose integrated with a sensor port in accordance with an embodiment of the present invention.
Figure 4:
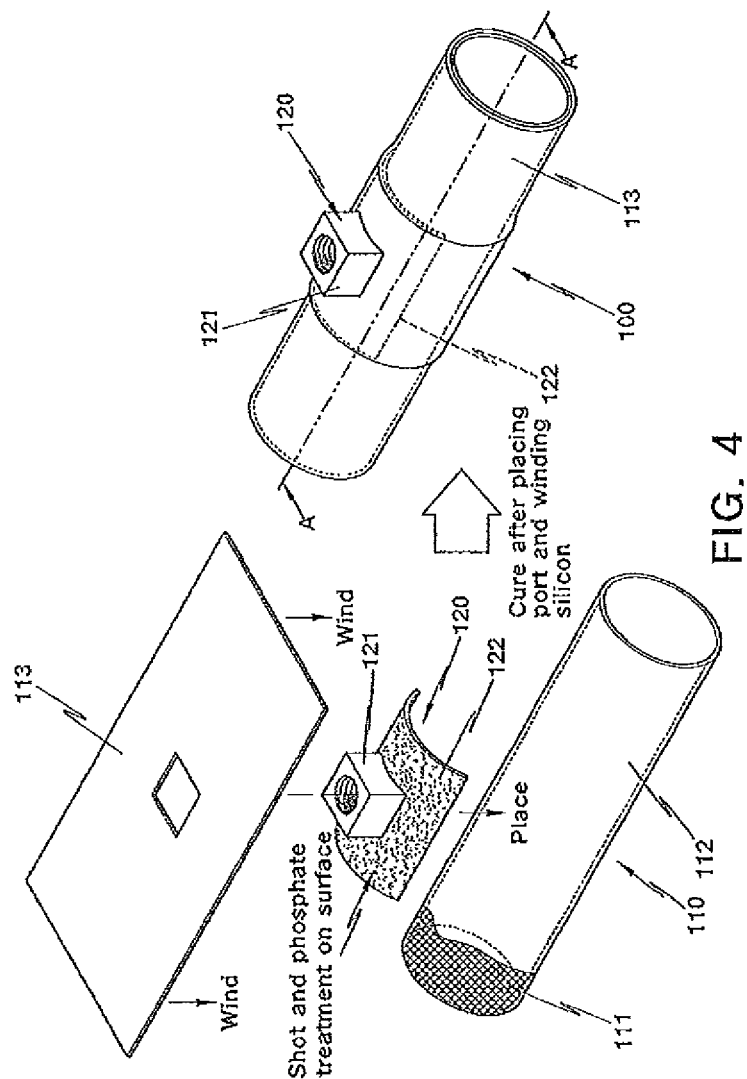
FIG. 4 is a diagram illustrating a method for manufacturing the silicon hose of FIG. 3.

FIG. 3 is a perspective view showing a silicon hose integrated with a sensor port in accordance with an embodiment of the present invention, FIG. 4 is a diagram illustrating a method for manufacturing the silicon hose, and FIG. 5 is a cross-sectional view taken along line A-A of FIG. 4.

In one aspect, the present invention provides a silicon hose integrated with a sensor port. According to an embodiment, the silicon hose 100 comprises a base hose 110, a sensor port 120 integrally mounted to the base hose 110, and an outer cover layer 113. The sensor port 120 includes a sensor connection portion 121 and an embedded portion 122 integrally formed with the sensor connection portion 121. A sensor is to be mounted through the sensor connection portion 121. Examples of the sensor includes a temperature sensor, a pressure sensor, an ion conductivity sensor, and the like. The outer cover layer 113 surrounds the base hose 110 and the embedded portion 122 such that the sensor port 120 is integrally fixed on an outer circumference of the base hose.

As shown in the figures, the sensor connection portion 121 has a sensor hole 121a. A sensor is inserted through the sensor hole 121a and can detect the state (e.g., temperature, pressure, or ion conductivity) of the coolant flowing inside the base hose 110. The sensor may be securely connected by, for example, a screw thread formed on the inner circumference of the sensor hole 121a, as shown in FIG. 5. The embedded portion 122 may be formed, e.g., as a port plate integrally formed with the sensor connection portion 121.

By the embedded portion 122 surrounded by the outer cover layer, the sensor port 120 is integrally fixed to the outer circumference of the base hose 110. Preferably, the embedded portion 122 is formed as a plate having the same curvature as the base hose 110.

The sensor port 120 may be formed by molding a metal or polymer resin (e.g., polypropylene) material that can prevent ion release. Examples of the metal material include stainless steel (e.g., SUS316L) and aluminum alloy (e.g., Al 3003).

In another aspect, the present invention provides a method for manufacturing the silicon hose 100. The method comprises: providing a base hose 110; providing a sensor port 120 including a sensor connection portion 121 by which a sensor is to be mounted and an embedded portion 122 integrally formed with the sensor connection portion 121; forming an outer cover layer 113 onto the base hose by placing the embedded portion on an outer surface of the base hose and winding a silicon sheet material on the base hose and the embedded portion; and subjecting to a silicon curing process the base hose and the outer cover layer formed onto the base hose.

The base hose 110 can be manufactured by any known method such as extrusion, rolling, or a combination process thereof. According to an embodiment, the base hose 110 may be formed by stacking a plurality of silicon layers 112 and interposing a reinforcing layer 111 such as woolen yarn or wire between the silicon layers 112, as shown in FIG. 5.

For example, an inner extruded layer is molded using a silicon material by extrusion, woolen yarn is wound on the outer surface thereof, and the silicon sheet material is wound thereon to form an outer wound layer. Here, since it is necessary to prevent the hose from being crushed by the discharge pressure of a pump in a thermal management system, the hose should have a thickness greater than a predetermined level to prevent the hose from being crushed. Therefore, the woolen yarn and the silicon sheet material may be stacked repeatedly (e.g., five times) to form a plurality of outer wound layers, thus forming the hose.

Alternatively, the silicon hose may be manufactured in such a manner that the woolen yarn and the silicon sheet material are stacked repeatedly in the order of silicon, woolen yarn, and silicon from an inner surface layer to an outer surface layer.

In addition, the method disclosed in Korean Patent Application Publication No. 2008-41508 may be employed in which a metal wire is closely wound on the surface of an inner extruded layer molded by extrusion molding using a mold and a silicon sheet material is wound thereon to form an outer wound layer. Here, the wire is formed of an SUS material which is proven to prevent ion release and can provide a compressive strength suitable for the hose.

After the base (silicon) hose 110 is manufactured, the sensor port 120 is placed at a predetermined position on the outer surface of the base hose 110 and a silicon sheet material is wound to surround the outer surface of the base hose 110 and the embedded portion 122, thereby forming the outer cover layer 113 onto the base hose.

Thereafter, the silicon sheet material is cured such that the base hose 110, the outer cover layer 113, and the sensor port 120 are integrally formed.

In an appropriate step, an opening 114 is formed on the base hose 110 or the silicon hose 100 by punching.

In case where a sensor port formed of a metal material such as SUS316 or Al 3003 is used, surface treatment may, suitably, be performed on the sensor port to strengthen the bonding between the metal material to the silicon.

As the surface treatment, after a roughening process for increasing the surface area of the sensor port is performed, a coating agent for improving the bondability may be applied to the surface subjected to the roughening process. Here, as the roughening process, the surface area of the metal material may be increased by a shot process of shooting small metal bails to the surface of the metal material, and as the coating agent for improving the bondability, phosphate may be coated on the resulting surface of the metal material (refer to FIG. 4).

The phosphate chemically bonds with the silicon hose to improve the bondability between the silicon hose and the sensor port, thus allowing the silicon hose and the sensor port to be completely bonded to each other. Especially, by the complete bonding between the metal and resin materials, the phosphate prevents the silicon hose from bursting, which may occur adjacent to the sensor port, and thereby prevents water from leaking.

Preferably, a waterproof layer 115 may be formed on the inner circumference of the opening 114, by applying a silicon waterproofing agent so as to prevent water leakage through the silicon layer which forms the silicon hose. The coated silicon waterproofing agent may be cured at the same time as the silicon sheet material is cured. Alternatively, it may be cured after the silicon sheet material is cured.

With the silicon hose integrated with a sensor port according to the present invention, manufacturing cost of the system or vehicle can be decreased, overall weight thereof can be decreased, user convenience can be attained, and fuel efficiency can be improved.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A silicon hose integrated with a sensor port, the silicon hose comprising:
   a base hose;
   a sensor port including a sensor connection portion, to which a sensor is connected, and an embedded portion integrally formed with the sensor connection portion; and
   a silicon-based outer cover layer which surrounds the base hose and the embedded portion such that the sensor port is integrally fixed on an outer circumference of the base hose,
   wherein the base hose has an opening through which a coolant inside the base hose is in fluid communication with the sensor connection portion,
   wherein a coating agent layer is interposed between the surface of the sensor port formed of metal and the outer cover layer, and
   wherein the coating agent layer is formed by coating the surface of the sensor port with phosphate.

2. The silicon hose of claim 1, wherein the embedded portion is formed in a plate shape that has a curvature same as the curvature of the base hose.

3. The silicon hose of claim 1, wherein the sensor port is formed of metal or polymer resin having a low ion release rate.

4. The silicon hose of claim 1, wherein the base hose is formed by stacking a silicon layer and a reinforcing layer, and the embedded portion is interposed between the uppermost silicon layer of the stacked silicon layers and the outer cover layer.

5. The silicon hose of claim 1, wherein a silicon waterproof layer is formed on an inner circumference of the opening.

6. A method for manufacturing a silicon hose integrated with a sensor port, the method comprising:
   providing a base hose;
   providing a sensor port including a sensor connection portion by which a sensor is to be mounted and an embedded portion integrally formed with the sensor connection portion;
   forming an outer cover layer onto the base hose by placing the embedded portion on an outer surface of the base hose and winding a silicon sheet material on the base hose and the embedded portion; and
   subjecting to a silicon curing process the base hose and the outer cover layer formed onto the base hose,
   wherein when the sensor port formed of metal is used, a roughening process for increasing the surface area of the sensor port, to which the silicon sheet material is bonded, is performed, and a coating agent for improving bondability is applied to the surface subjected to the roughening process.

7. The method of claim 6, wherein the embedded portion has a plate shape that has a curvature same as the curvature of the base hose.

8. The method of claim 6, wherein the sensor port is formed of metal or polymer resin having a low ion release rate.

9. The method of claim 6, wherein the surface of the sensor port is subjected to shot treatment as the roughening process.

10. The method of claim 6, wherein the coating agent comprises phosphate.

11. The method of claim 6, further comprising forming an opening in the base hose or the silicon hose, through which a coolant inside the base hose is in fluid communication with the sensor connection portion.

12. The method of claim 11, further comprising forming a silicon waterproof layer on an inner circumference of the opening.

* * * * *